US008695201B2

(12) United States Patent
Morris

(10) Patent No.: US 8,695,201 B2
(45) Date of Patent: Apr. 15, 2014

(54) ELASTIC TUBE ALIGNMENT SYSTEM FOR PRECISELY LOCATING COMPONENTS

(75) Inventor: Steven E. Morris, Fair Haven, MI (US)

(73) Assignee: GM Global Technology Operations LLC, Detroit, MI (US)

(*) Notice: Subject to any disclaimer, the term of this patent is extended or adjusted under 35 U.S.C. 154(b) by 203 days.

(21) Appl. No.: 13/187,675

(22) Filed: Jul. 21, 2011

(65) Prior Publication Data

US 2013/0019455 A1    Jan. 24, 2013

(51) Int. Cl.
*B21J 15/02* (2006.01)
(52) U.S. Cl.
USPC .............. 29/525.05; 29/450; 24/453; 24/456; 411/182; 411/508; 411/908
(58) Field of Classification Search
USPC ............. 29/450, 525.05, 897–897.35; 16/2.1; 24/456, 297, 453, 289; 256/66; 411/179, 182, 508, 510, 509, 908
See application file for complete search history.

(56) References Cited

U.S. PATENT DOCUMENTS

| 3,005,282 | A | 10/1961 | Christiansen | |
| 6,971,831 | B2* | 12/2005 | Fattori et al. | 411/508 |
| 7,764,853 | B2 | 7/2010 | Yi et al. | |

OTHER PUBLICATIONS

"Elastic Averaging in Flexure Mechanisms: A Multi-Beam Parallelogram Flexture Case-Study" by Shorya Awtar and Edip Sevincer, Proceedings of IDETC/CIE 2006, Paper DETC2006-99752, American Society of Mechanical Engineers (ASME), Sep. 2006.

"The Design of High Precision Parallel Mechanisms using Binary Actuation and Elastic Averaging: With Application of MRI Cancer Treatment" by L.M. DeVita, J.S. Plante and S. Dubowsky, 12th IFToMM World Congress (France), Jun. 2007.

"Precision Connector Assembly using Elastic Averaging" by Patrick J. Willoughby and Alexander H. Slocum, Massachusetts Institute of Technology (MIT), Cambridge, MA, American Society for Precision Engineering, 2004.

"Passive Alignment of Micro-Fluidic Chips Using the Principle of Elastic Averaging" by Sitanshu Gurung, Thesis, Louisiana State University, Dept. of Mechanical Engineering, Dec. 2007.

"An Anti Backlash Two-Part Shaft Coupling with Interlocking Elastically Averaged Teeth" by Mahadevan Balasubramaniam, Edmund Golaski, Seung-Kil Son, Krishnan Sriram and Alexander Slocum, Precision Engineering, V. 26, No. 3, Elsevier Publishing, Jul. 2002.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/570,959, filed Aug. 9, 2012, entitled "Elastic Cantilever Beam Alignment System for Precisely Aligning Components", inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

(Continued)

*Primary Examiner* — Richard Chang
(74) *Attorney, Agent, or Firm* — Cantor Colburn LLP

(57) ABSTRACT

An elastic tube alignment system for the mating of components utilizing the principle of elastic averaging. A plurality of geometrically separated elastic tube (male) alignment features are disposed on a first component, while a plurality of one-to-one corresponding aperture (female) alignment features are provided on a second component. During the mating of the components, each elastic tube and its respective aperture provide elastic deformation, which, on average, precisely aligns the components.

15 Claims, 7 Drawing Sheets

(56) References Cited

OTHER PUBLICATIONS

U.S. Appl. No. 13/571,030, filed Aug. 9, 2012, entitled "Elastic Tube Alignment System for precisely Locating an Emblem Lens to an Outer Bezel", inventors: Joel Colombo, Steven E. Morris and Michael D. Richardson.

U.S. Appl. No. 13/330,718, filed Dec. 20, 2011, entitled "Precisly Locating Components in an Infrared Welded Assembly"; inventor: Steven E. Morris.

U.S. Appl. No. 13/459,118, filed Apr. 28, 2012, entitled "Stiffened Multi-Layer Compartment Door Assembly Utilizing Elastic Averaging", inventor: Steven E. Morris.

* cited by examiner

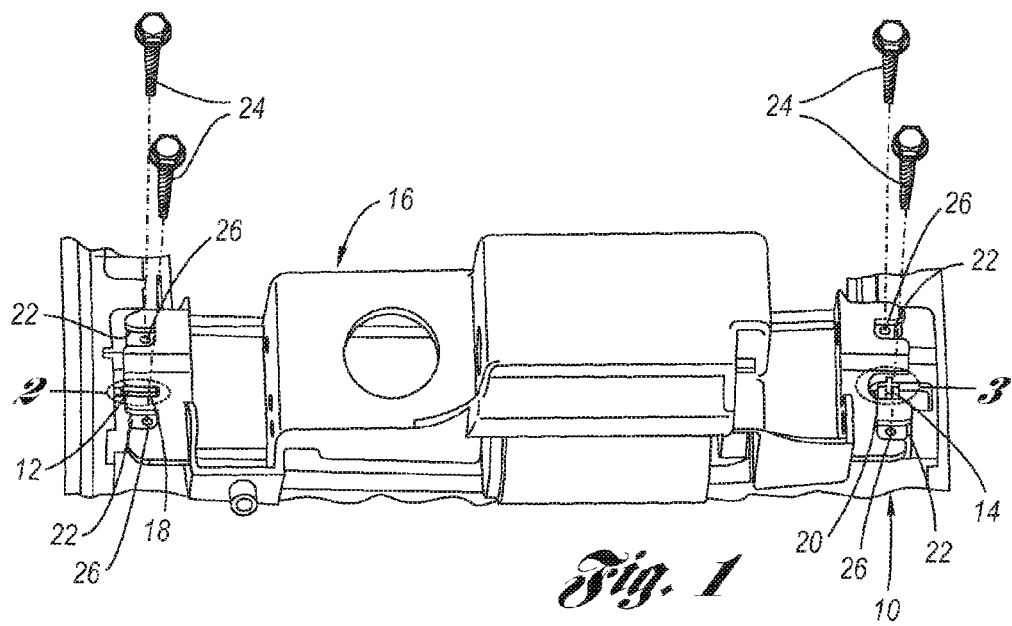
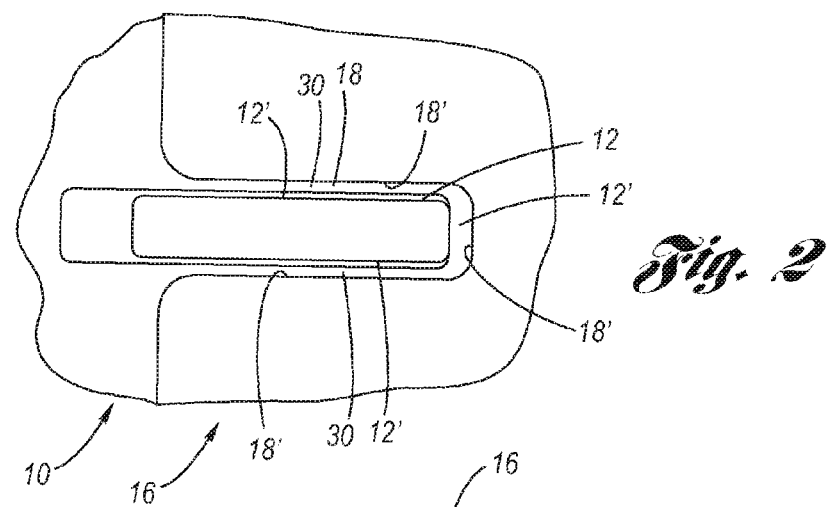
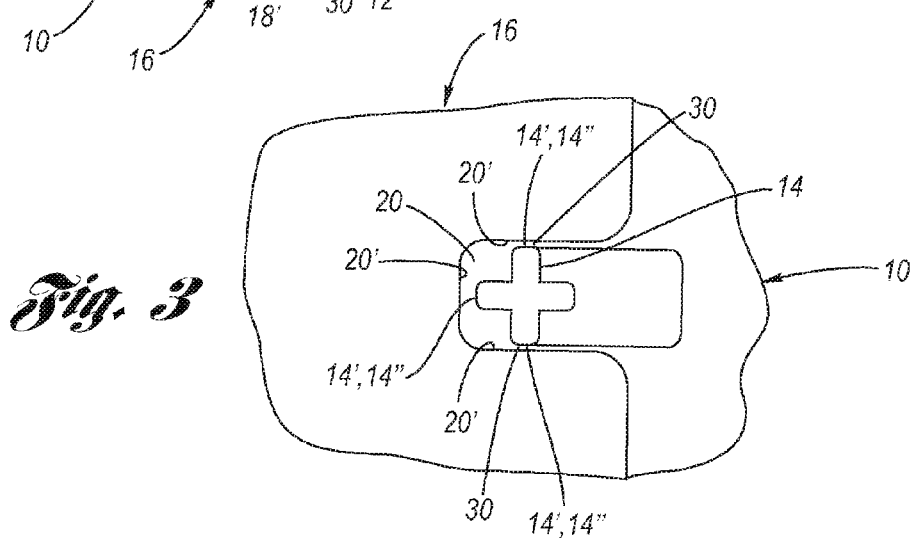

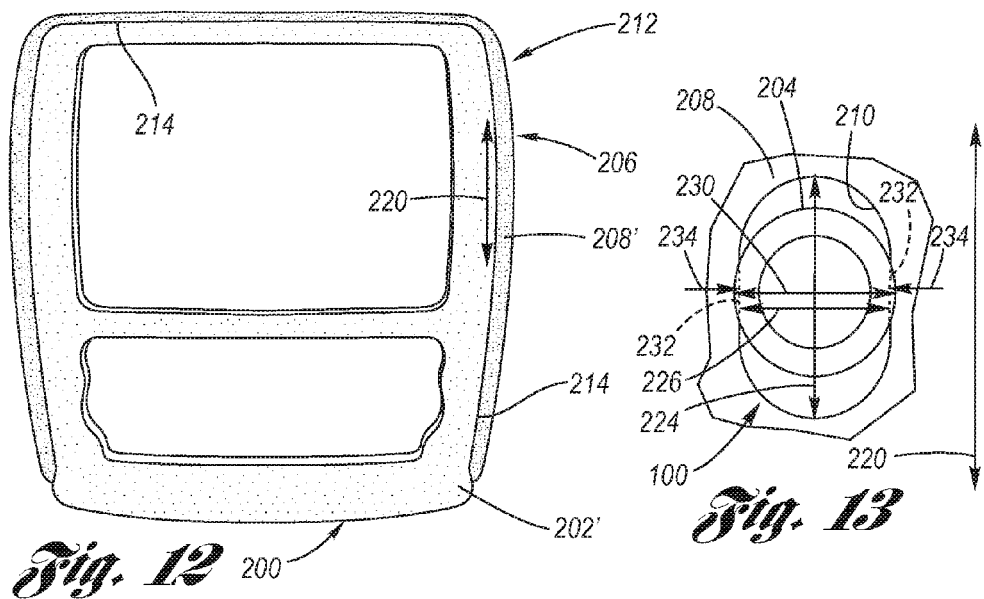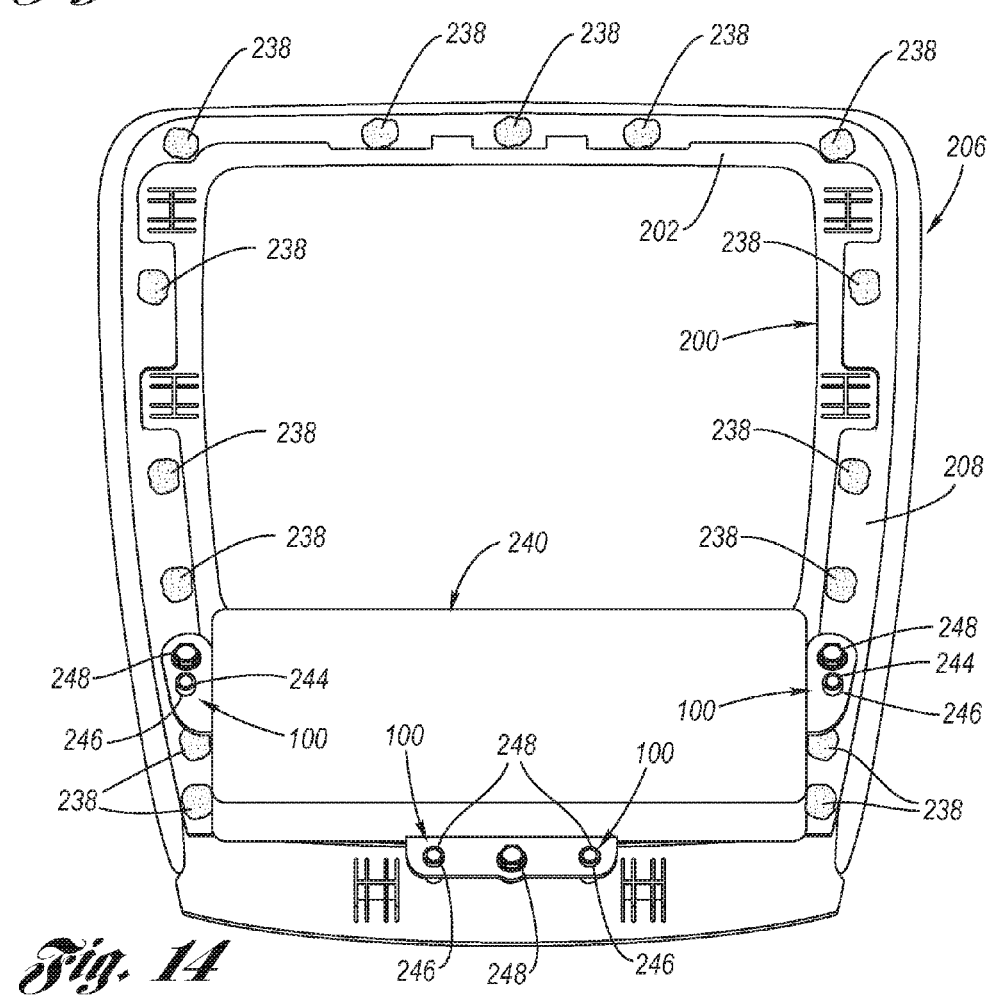

ELASTIC TUBE ALIGNMENT SYSTEM FOR PRECISELY LOCATING COMPONENTS

TECHNICAL FIELD

The present invention relates to location features for aligning of components during a mating operation. More particularly, the present invention relates to a plurality of mutually spaced apart elastic tube alignment features of a first component which elastically deform on average when mated to receiving aperture alignment features of a second component to thereby precisely align the first and second components during a mating operation.

BACKGROUND OF THE INVENTION

Currently, components which are to be mated together in a manufacturing process are mutually located with respect to each other by 2-way and/or 4-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, there can occur significant positional variation as between the mated first and second components which contributes to the presence of undesirably large and varying gaps and otherwise poor fit therebetween.

By way of example, FIGS. 1 through 3 illustrate the prior art location modality for the aligning of two components as they are being mutually mated.

A first component 10 has a plurality of male alignment features in the form of an upstanding elongated rib 12 and spaced therefrom an upstanding four-pronged stud 14. A second component 16 has a plurality of female alignment features in the form of a narrow slot 18 disposed at an end and a wide slot 20 disposed at the opposite end. The additional slots 22 of the second component 16 are intended to provide clearance for threaded fasteners 24 to be screwed into screw receiving holes 26 of the first component 10.

As best shown at FIG. 2, the elongated rib 12 is loosely received into the narrow slot 18, wherein the spacing 30 between the sides 18' of the narrow slot and the sides 12' of the elongated rib allow spacing therebetween for accommodating manufacturing variances. Similarly, as best shown at FIG. 3, the pronged stud 14 is loosely received into the wide slot 20, wherein the spacing 30 between the sides 20' of the wide slot and the sides 14" of the prongs 14' of the pronged stud allow spacing therebetween for accommodating manufacturing variances. For example, the spacing (or gap, or clearance) 30 between the male and female alignment features may be 0.6 mm, whereby the error of mating of the first component to the second component may be up to about 1.2 mm as a cross-car and up-down float.

In operation, as the first and second components are mated together, the initial contact therebetween occurs when the elongated rib passes into the narrow slot and the pronged stud passes into the wide slot, whereby the first and second components are brought into a general alignment to one another. The larger size of the narrow slot in relation to the elongated rib and the larger size of the wide slot in relation to the pronged stud allow the mating to proceed smoothly and effortlessly as the first and second components mate, even if there is present manufacturing variance in terms of size and position of the alignment features. Problematically, however, there is considerable float as between the elongated rib in relation to the narrow slot and as between the pronged stud and the wide slot. This float (or play), as mentioned above, allows for the first component to be aligned relative to the second component generally, but not precisely. When the threaded fasteners are screwed in, any misfit of alignment becomes manifest, and the visible joint between the two components may be irregular, have too large a gap, be unbalanced in appearance, etc., in any event the misfit of alignment rendering the fit unacceptable for a Class A finish.

Accordingly, what remains needed in the art is to somehow provide an alignment modality for the mating of components, wherein when mating is completed there is a lack of play as between the male and female alignment features so as to provide a precision alignment, yet the aligned mating proceeds smoothly and effortlessly each time.

SUMMARY OF THE INVENTION

The present invention is an elastic tube alignment system for the precise mating of components, particularly motor vehicle components, wherein when mating is completed there is a lack of float (or play) as between the male and female alignment features so as to provide a precision alignment with stiffened positional constraint, yet the aligned mating proceeds smoothly and effortlessly each time.

The elastic tube alignment system according to the present invention operates on the principle of elastic averaging. A plurality of geometrically separated elastic tube (male) alignment features are disposed on a first component, while a plurality of one-to-one corresponding aperture (female) alignment features are provided on a second component, wherein the elastic tube alignment features have a diameter exceeding a cross-section of the aperture alignment features. However, the first and second components may each have some of the elastic tube alignment features and some of the aperture alignment features so long as they one-to-one correspond so that they are mutually engageable with one another. During the mating of the first component to the second component, each elastic tube alignment feature respectively engages its corresponding aperture alignment feature. As the elastic tube alignment features are received into the aperture alignment features, any manufacturing variance in terms of position and size of the elastic tube and aperture alignment features is accommodated by elastic deformation, on average, at the interface between the elastic tube and aperture alignment features. This elastic averaging across the plurality of elastic tube and aperture alignment features provides a precise alignment as between the first and second components when they are mated relative to each other, and yet the mating proceeds smoothly and easily.

In accordance with the present invention, the elastic averaging provides a precise alignment of the components within a variance X', defined by $X'=X/\sqrt{N}$, where X is the average manufacturing variance of the elastic tube alignment features and the aperture alignment features, and N is the number thereof. Thus, the needed clearance for the male and female alignment features of the prior art is obviated by the present invention.

According to the present invention, the elastic tube alignment features are elastically deformable by elastic compression of the tube wall of the elastic tube, which deformation is preferably resiliently reversible. In an exemplar application of the present invention, the elastic tube alignment features are connected (typically integrally) with a first component in upstanding, perpendicular relation to a predetermined surface of the first component. Further according to the present invention, it is possible, but not required, for the aperture alignment members to be elastically deformable by elastic expansion of the aperture wall of the aperture, which deformation is preferably resiliently reversible. In an exemplar application of the present invention, the aperture alignment features are disposed at a second component, typically as a slot or a hole in a predetermined surface of the second component, wherein the diameter of the elastic tube alignment features exceeds the cross-section of the aperture alignment features, whereby elastic deformation occurs as each elastic tube alignment feature is received into its respective aperture alignment feature. The process of mating with precise alignment is both smoothly and easily performed. This is enhanced by a tapering (smaller diameter with increasing height) of the elastic tube alignment features so as to facilitate their initial entry into the aperture alignment features, and by beveling of the aperture wall of the aperture alignment features so as to locally pronounce the elastic deformation at the interface of the aperture wall with the tube wall.

In operation, as the first and second components are mated together, the initial contact therebetween is at the plurality of geometrically spaced apart elastic tube alignment members passing into their one-to-one corresponding aperture alignment features. Because of the larger size of the diameter of elastic tube alignment features relative to the cross-section of the aperture alignment features, an elastic deformation occurs at the interface therebetween, and this deformation is averaged over the geometrical distribution of the plurality of elastic tube alignment features. The alignment becomes precise when the first and second components have fully mated because the tapering of the elastic tube alignment features provides a largest diameter to the cross-section of the aperture alignment features when the first and second components have arrived at final mating. When an affixment modality is implemented, such as for example threaded fasteners, heat staking, sonic welding, push nuts, clips, etc., the precise alignment becomes manifest, and the visible joint between the two components is a perfect Class A finish.

Accordingly, it is an object of the present invention to provide an elastic tube alignment modality for the mating of components, wherein when mating is completed there is a lack of play as between the elastic tube and aperture alignment features so as to thereby provide a precision alignment, yet the mating proceeds smoothly and effortlessly.

This and additional objects, features and advantages of the present invention will become clearer from the following specification of a preferred embodiment.

BRIEF DESCRIPTION OF THE DRAWINGS

FIG. 1 is a perspective view of a first component generally aligned to a second component before final assembly by threaded fasteners, wherein a prior art alignment modality is utilized.

FIG. 2 is a detail, cut-away view, seen at demarcation 2 of FIG. 1.

FIG. 3 is a detail, cut-away view, seen at demarcation 3 of FIG. 1.

FIG. 12 is a plan view of the Class A front side of the first and second alternate components mated as in FIG. 11.

FIG. 13 is a detail view, seen at demarcation 13 of FIG. 11.

FIG. 14 is plan view of the Class B rear side of the first and second alternate components now mated to each other, as in FIG. 11, now affixed to each other by heat stacking, and now additionally showing a third component mated to the first and second alternate components including alignment therewith via elastic averaging of deformation of the elastic tube and aperture alignment features according to the present invention.

DESCRIPTION OF THE PREFERRED EMBODIMENT

Figure 4:
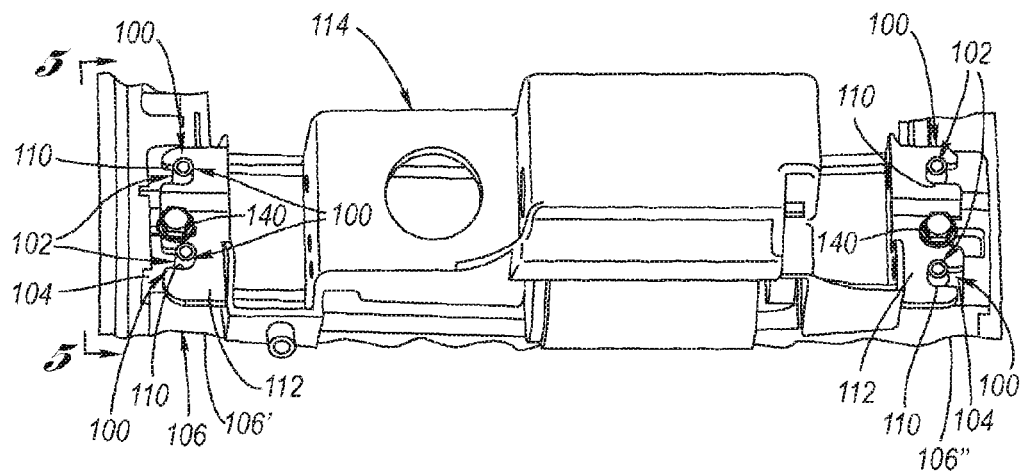
FIG. 4 is a perspective view of a first component generally aligned to a second component before final assembly by threaded fasteners, wherein the view is similar to FIG. 1 except now an elastic tube alignment system according to the present invention is utilized.

Referring now to the Drawing, FIGS. 4 through 14 depict various examples of the structure and function of the elastic tube alignment system according to the present invention.

Referring firstly to FIGS. 4 through 8, the general principles of the elastic tube alignment system 100 according to the present invention will be detailed, wherein the elastic tube alignment system operates on the principle of elastic averaging.

Figure 5:
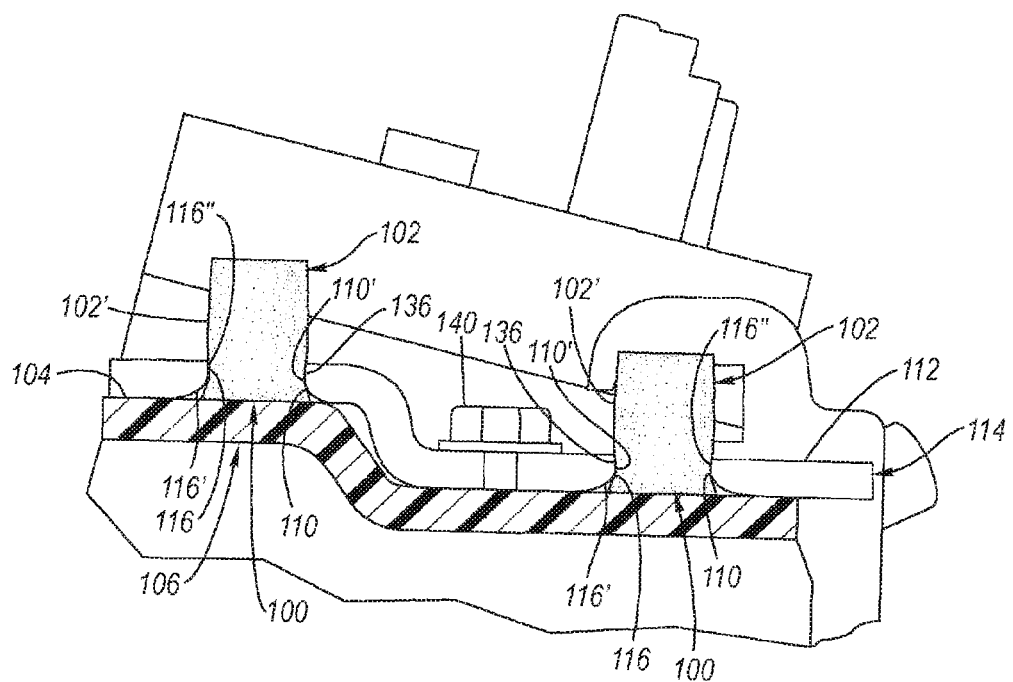
FIG. 5 is a partly sectional view, seen along line 5-5 of FIG. 4.

A plurality of mutually separated elastic tube alignment features (serving as male alignment features) 102 (hereinafter referred to simply as "elastic tubes") are disposed on a first surface 104 of a first component 106. As best shown at FIG. 5, the elastic tubes 102 are upstanding in normal relation to the first surface 104, wherein a mutually separated pair of elastic tubes is disposed at both a left end 106' and a right end 106" of the first component 106. Each of the elastic tubes 102 is tubular in shape, having a tube wall 102'. Preferably, the tube wall 102' defines a hollow cylinder. The tube wall 102' is elastic, being preferably stiffly elastic, wherein the shape is resiliently reversible in response to a compressive force being applied thereto. A preferred plastic material is one having elastic properties so as to deform without fracture, as for example acrylonitrile butadiene styrene (ABS).

A plurality of aperture alignment features (serving as female alignment features) 110 (hereinafter referred to simply as "apertures") are disposed in a second surface 112 of a second component 114, being located in one-to-one correspondence with the plurality of elastic tubes 102; that is, for each elastic tube is a respective aperture into which it is receivable. Thus, the plurality of apertures are geometrically distributed in coordinated relationship to a geometrical distribution of the plurality of elastic tubes such that each elastic tube is receivable into its respect aperture. While the apertures 110 are shown as elongated slots, it is clear the aperture shape could be otherwise, such as for example an elongated hole, a generally round hole, etc. Preferably, an aperture wall 116 which defines the opening demarcation of the aperture alignment features 102 is beveled 116'. A preferred plastic material for the second component 114 in which the apertures 110 are disposed is one having elastic properties so as to deform without fracture, as for example acrylonitrile butadiene styrene (ABS).

While it is preferred for the first and second components 106, 114 to be motor vehicle components, this is not a requirement.

Figure 6:
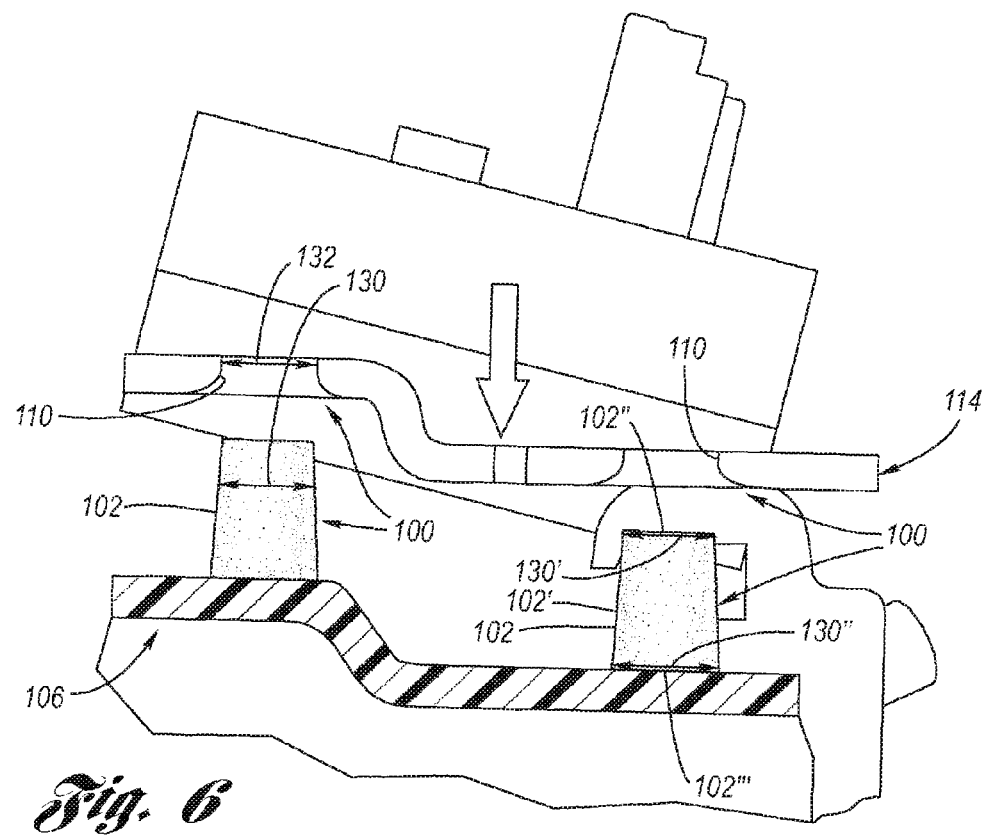
FIG. 6 is a partly sectional view, similar to FIG. 5, wherein a first stage of mating between the first and second components is shown.

As depicted at FIG. 6, the diameter 130 of the elastic tubes 102 exceeds a cross-section 132 of the apertures 110, whereby elastic deformation proceeds as each elastic tube is received into its respective aperture. As best shown at FIG. 5, the elastic deformation of the tube wall 102' is locally pronounced due to the beveling 116' of the aperture wall 116, wherein there is provided a relatively small contact area as between the aperture wall contact surface 116" and the tube wall 102' (see FIG. 5). Since the compressive force between the aperture wall and the tube wall is limited to the smaller surface area of the aperture wall contact surface, a higher compressive pressure is provided, see for example the elastic deformation 136 shown at FIGS. 5, 7 and 8.

The process of mating the first component 106 to the second component 114 is both smoothly and easily performed, facilitated by a tapering (smaller diameter with increasing height, as shown comparatively at FIG. 6 by distal and proximal diameters 130' and 130" of the distal and proximal ends 102", 102''' of the tube wall 102'. In this regard, the tapering of the elastic tubes presents a largest diameter 130" at the cross-section of the apertures when the first and second components have arrived at final mating; further, the tapering may present a smallest diameter 130' of the tube wall at the distal end 102" so as to ease initial entry of the elastic tubes into the apertures.

During the mating of the first component 106 to the second component 114, each elastic tube 102 respectively engages its corresponding aperture 110, wherein as the elastic tubes pass into the apertures, any manufacturing variance in terms of position and size thereof is accommodated by elastic deformation on average of the plurality of elastic tubes and apertures. This elastic averaging across the plurality of elastic tubes and apertures 102, 110 provides a precise alignment as between the first and second components 106, 114 when they are finally mated relative to each other.

According to the present invention, the elastic averaging provides elastic deformation of the interface between the plurality of geometrically distributed elastic tube alignment features 102 and the aperture alignment features 110, wherein the average deformation provides a precise alignment, the manufacturing variance being minimized to X', defined by X'=X/√N, where X is the manufacturing variance of the elastic tube and aperture alignment features and N is the number thereof.

Further according to the present invention, it is possible, but not required, for the aperture alignment members 110 to be also elastically deformable by elastic expansion of the aperture sidewall, which deformation is also preferably reversible; see for example 110' at FIG. 5.

Figure 7:
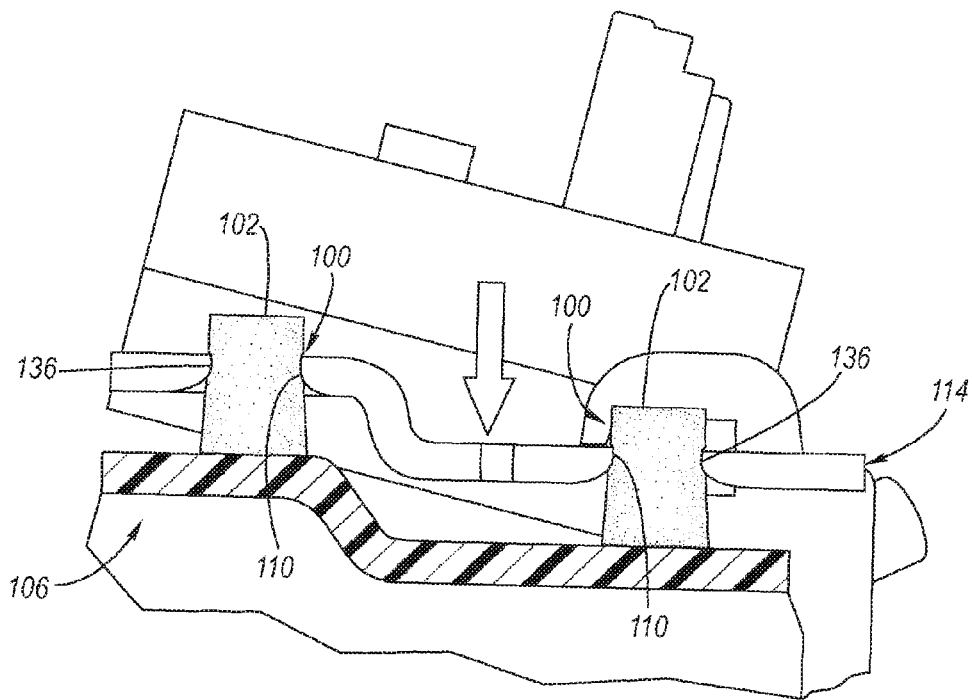
FIG. 7 is a partly sectional view, similar to FIG. 5, wherein a middle stage of mating between the first and second components is shown.
Figure 8:
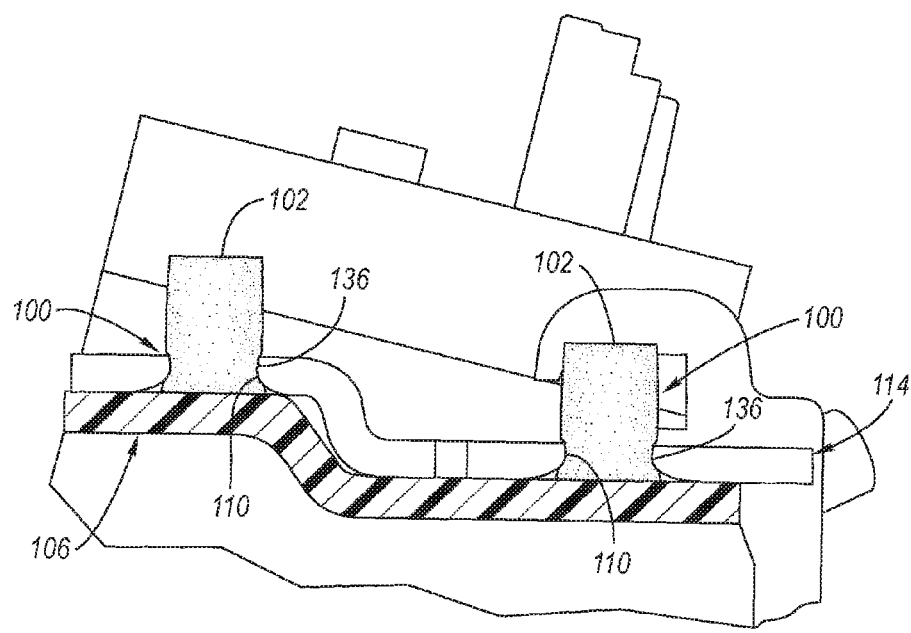
FIG. 8 is a partly sectional view, similar to FIG. 5, wherein a final stage of mating between the first and second components is shown.

Referring now to FIGS. 6 through 8, operation of the elastic tube alignment system 100 according to the present invention will be detailed.

As seen at FIG. 6, the first and second components 106, 114 are brought into close proximity with near alignment. Referring next to FIG. 7, as the first and second components 106, 114 are mated together, the initial contact therebetween is via the plurality of geometrically spaced apart elastic tubes 102 passing into their one-to-one corresponding apertures 110, whereduring the first and second components align to one another. The alignment is precise at FIG. 8, wherein the first and second components 106, 114 have now fully mated. The alignment is precise because of the largest size diameter of elastic tubes relative to the cross-section of the apertures results in elastic deformation, and this elastic deformation is elastic averaged over the plurality of geometrically distributed elastic tubes. When an affixment modality is implemented, such as for example threaded fasteners (see bolts 140 in FIGS. 4 and 5), heat staking, sonic welding, etc., the precise alignment becomes manifest, and the visible joint between the two components is a perfect Class A finish.

A comparison between FIGS. 1 and 4 brings attention to the advantage of the elastic tube alignment system 100 over the prior art alignment modality, wherein the present invention provides a stiffer assembly inherently without float, whereby, for example only two threaded fasteners 140 are needed, as opposed to four in the assembly of FIG. 1.

Turning attention now to FIGS. 9 through 14 a second example for implementing the elastic tube alignment system 100 according to the present invention will be detailed.

Figure 9:
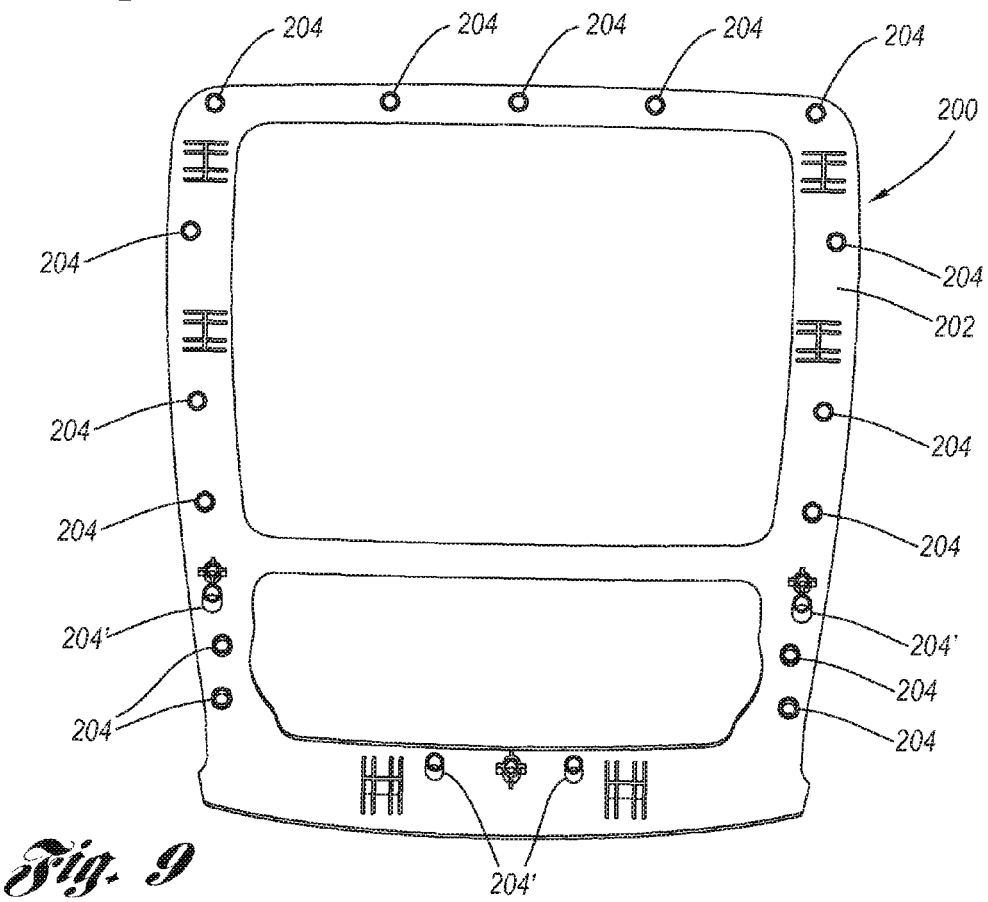
FIG. 9 is a plan view of a Class B rear side of a first alternate component having a plurality of elastic tube alignment features according to the present invention.
Figure 10:
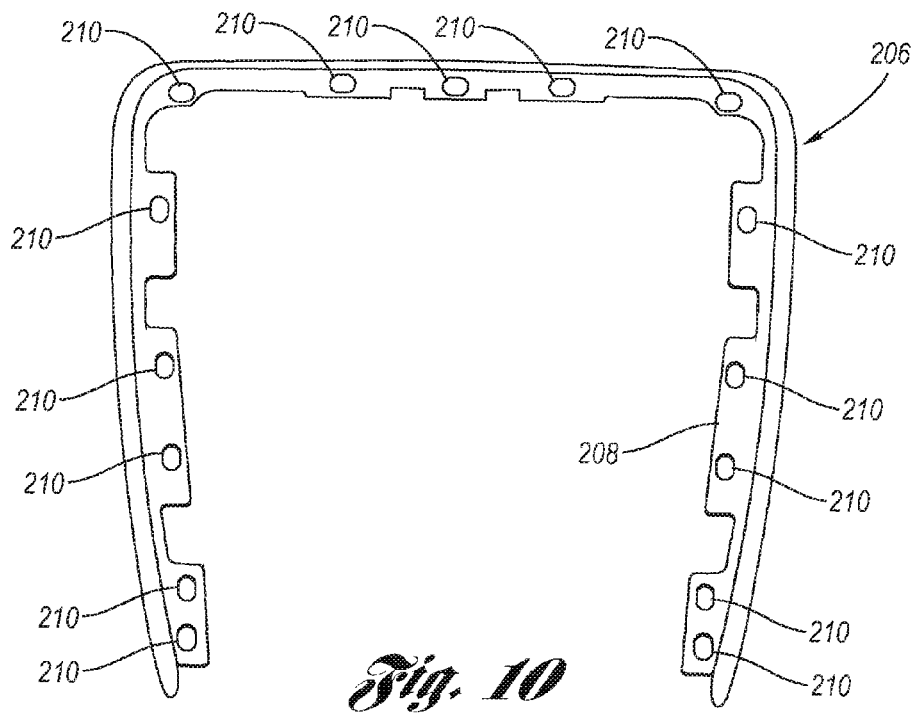
FIG. 10 is a plan view of a Class B rear side of a second alternate component having a plurality of aperture alignment features according to the present invention in one-to-one correspondence to the plurality of elastic tube alignment features of FIG. 9.

As shown at FIG. 9, a first, or base, component 200 has a Class B base rear surface 202. A plurality of geometrically distributed elastic tube alignment features 204 are upstanding in perpendicular relation to the base rear surface 202, being integrally formed therewith. As shown at FIG. 10, a second, or bezel, component 206 has a Class B bezel rear side 208. A plurality of geometrically distributed aperture alignment features 210 are formed in the bezel component.

Figure 11:
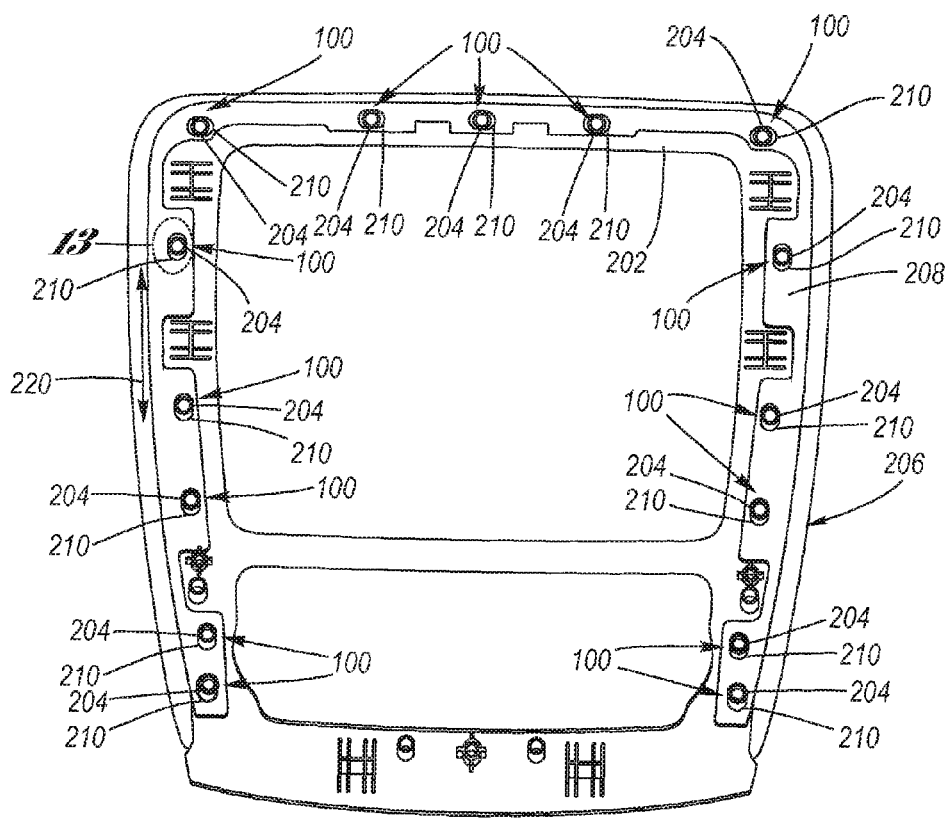
FIG. 11 is plan view of the Class B rear side of the first and second alternate components now mated to each other utilizing elastic averaging of deformation of the elastic tube and aperture alignment features of FIGS. 9 and 10 according to the present invention.

As depicted at FIG. 11, the base and bezel components 200, 206 have been aligned relative to each other by elastic average deformation of the elastic tube features 204 interfacing with the aperture alignment features 210 according to the elastic tube alignment system 100 of the present invention, whereby the base component is precisely aligned with respect to the bezel component, having the aforementioned reduced manufacturing variance of X'=X/√N.

The result of the precise alignment provided by the elastic averaging is depicted at FIG. 12 which shows the opposite, visible Class A side, wherein the visible joint 214 between the base and bezel components 200, 204 has everywhere a perfect fit because of the elastic averaging of the elastic tubes with the apertures according to the present invention.

As can best be seen by simultaneous reference to FIGS. 11, 12 and 13, the visible joint has local joint components disposed adjacent each elastic tube and its respective aperture. For example, the elastic tubes and apertures 204, 210 at demarcation 13 of FIG. 11 is disposed adjacent a local joint component 220 of the visible joint 214 of FIG. 12. As shown at FIG. 13, the aperture alignment feature 210 has an elongation axis 224 that is oriented parallel to the local joint component 220, wherein the length exceeds the diameter 230 of the elastic tube alignment feature 204. The cross-section 226 of the aperture alignment feature 210 is oriented perpendicular to the local joint component 220, wherein the cross-section has a length less than the diameter 230, thus assuring elastic deformation 232, due to compressive force 234, will be applied by the aperture alignment feature to the elastic tube alignment feature perpendicular to the elongation axis and the orientation of the local joint component 220, thereby assuring there is provided a Class A fit at the visible joint.

Turning attention lastly to FIG. 14, some or all the elastic tubes are heat staked 238 to affix the base component to the bezel component. Now additionally, a third component 240 has been affixed to the previously affixed base and bezel components. In this regard, firstly a pair of elastic tubes 244 of the base component 200 are received into apertures 246 of the third component 240, wherein as the elastic tubes are received into the apertures in accordance with the elastic tube alignment system 100, wherein elastic averaging occurs as described above. Once fully mated with a precise alignment, threaded fasteners 248 are threadably engaged into screw receiving holes of the base component 200.

Figure 15:
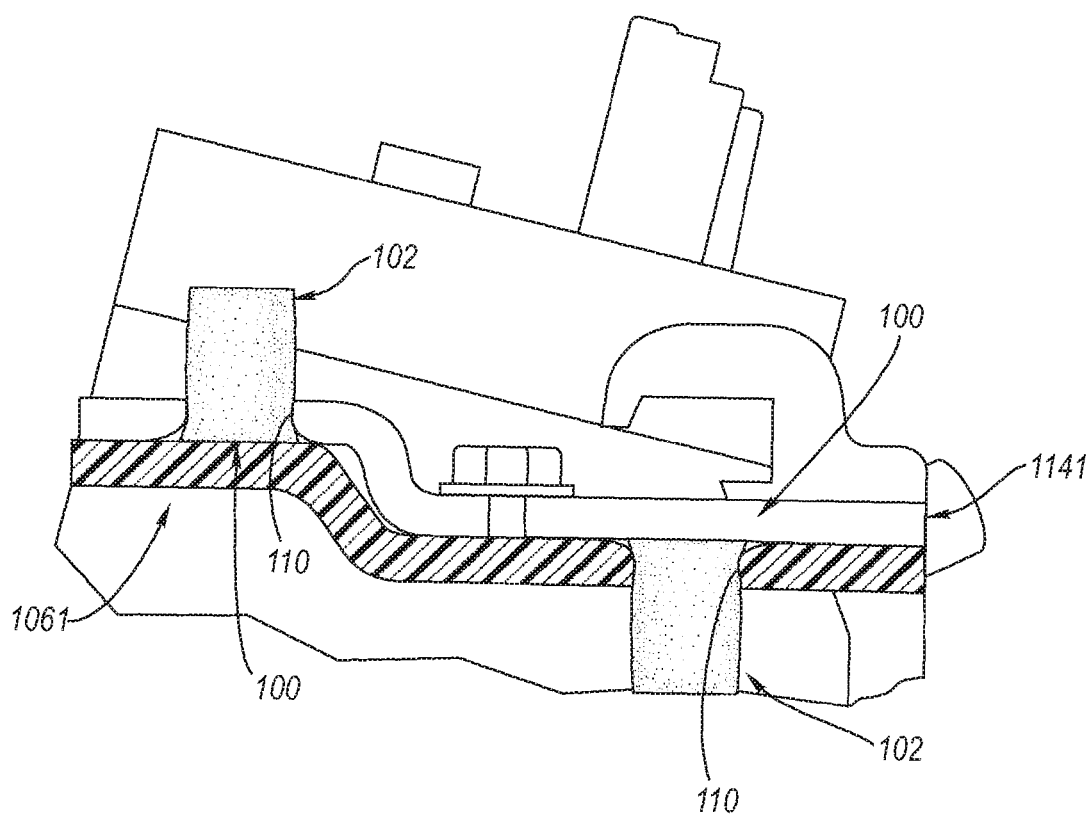
FIG. 15 is a partly sectional view similar to FIG. 5, wherein now the first and second components each have an elastic tube and aperture alignment feature according to the present invention.

The elastic tubes 102 and the apertures 110 may reside on either of the first and second components, and indeed, some elastic tubes and some apertures may be present at both the first and second components. By way of example, FIG. 15 is a view as in FIG. 5, wherein now the elastic tube alignment system 100 is characterized by the first component 1061 having both an elastic tube and an aperture, while, likewise, the second component 1141 having also both an elastic tube and an aperture.

Figure 16:
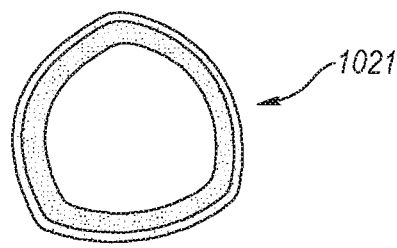
FIG. 16 is a top plan view of a trilobular shaped elastic tube alignment feature according to the present invention.

Additionally, while cylindrical elastic tubes are preferred, the shape may be non-cylindrical. For example, as shown at FIG. 16, an elastic tube 1021 in accordance with the present invention may have a trilobular shape and may or may not have varying thickness of the tube wall.

It will be understood from the foregoing description, several notable aspects of the present invention. The present invention: 1) eliminates the manufacturing variation associated with the clearances needed for a 2-way and 4-way locating schemes of the prior art; 2) reduces the manufacturing variation by elastically averaging the positional variation; 3) eliminates the float of components as is present in the prior art; 4) provides an over constrained condition that reduces the positional variation by averaging out each locating features variation, and additionally stiffens the joint reducing the number of needed fasteners; 5) provides more precise location of components; and, 6) provides a stiffened assembly of the mated first and second components with elimination of rattle between the components in elastic deformation with respect to each other.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An elastic tube alignment system for aligning components to each other, comprising:
 a first component;
 a second component;
 a plurality of upstanding elastic tubes connected to at least one of said first and second components, each elastic tube of the plurality of upstanding elastic tubes having a tube wall;
 a plurality of apertures formed in at least one of said first and second components, each aperture of the plurality of apertures having an aperture wall;
 wherein said plurality of apertures are geometrically distributed in coordinated relationship to a geometrical distribution of said plurality of elastic tubes such that each elastic tube of the plurality of upstanding elastic tubes is receivable into a respective aperture of the plurality of apertures;
 wherein when each said elastic tube of the plurality of elastic tubes is received into its respective aperture of the plurality of apertures, an elastic deformation occurs at an interface between the tube wall and the aperture wall, wherein said elastic deformation is a result of each said tube wall having a diameter larger than at least a portion of its respective aperture; and
 wherein said elastic deformation is averaged over the total of said elastically deformed tubes such that the first component is precisely located relative to the second component, said elastic deformation comprising resiliently reversible elastic deformation of each said tube wall and said aperture wall.

2. The elastic tube alignment system of claim 1, wherein each said tube wall defines a hollow cylinder.

3. The elastic tube alignment system of claim 1, wherein said tube wall has a non-cylindrical shape.

4. The elastic tube alignment system of claim 1, wherein each said tube wall is tapered, wherein the taper provides a smallest diameter distally from the first surface.

5. The elastic tube alignment system of claim 4, wherein each said aperture has a beveled aperture wall at said cross-section.

6. The elastic tube alignment system of claim 5, wherein each said aperture is elongated in relation to said cross-section along an elongation axis.

7. The elastic tube alignment system of claim 6, wherein a joint is formed when said first component is mated to said second component, wherein said elongation axis of each said aperture is oriented generally parallel in relation to a respectively adjacent local joint component of the joint, wherein said cross-section of said aperture is oriented generally perpendicular in relation to said elongation axis.

8. The elastic tube alignment system of claim 1, wherein said elastic deformation provides a stiffened assembly of said first and second components when said first and second components are mutually mated to each other.

9. The elastic tube alignment system of claim 1, wherein a predetermined number of elastic tubes of said plurality of elastic tubes is heat staked after said first component has been mated to said second component.

10. The elastic tube alignment system of claim 1, wherein each said tube wall is continuous to define a continuous hollow cylinder.

11. An elastic tube alignment system for aligning components to each other, comprising:
 a first component;
 a second component;
 a plurality of upstanding elastic tubes connected to at least one of said first and second components, each elastic tube of the plurality of upstanding elastic tubes having a tube wall;
 a plurality of apertures formed in at least one of said first and second components, each aperture of the plurality of apertures having an aperture wall;
 wherein said plurality of apertures are geometrically distributed in coordinated relationship to a geometrical distribution of said plurality of elastic tubes such that each elastic tube of the plurality of upstanding elastic tubes is receivable into a respective aperture of the plurality of apertures;
 wherein when each said elastic tube of the plurality of elastic tubes is received into its respective aperture of the plurality of apertures, an elastic deformation occurs at an interface between the tube wall and the aperture wall, wherein said elastic deformation is caused to each said tube wall having a diameter larger than at least a portion of its respective aperture;

wherein said elastic deformation is averaged over the total of said elastically deformed tubes such that the first component is precisely located relative to the second component, said elastic deformation comprising resiliently reversible elastic deformation of each said tube wall;

wherein each said aperture of the plurality of apertures has a beveled aperture wall at said aperture wall; and wherein each said aperture of the plurality of apertures is elongated in relation to a cross-section of said each aperture along an elongation axis.

12. The elastic tube alignment system of claim 11, wherein a joint is formed when said first component is mated to said second component, wherein said elongation axis of each said aperture is oriented generally parallel in relation to a respectively adjacent local joint component of the joint, wherein said cross-section of said aperture is oriented generally perpendicular in relation to said elongation axis.

13. The elastic tube alignment system of claim 11, wherein each said tube wall defines a hollow cylinder.

14. The elastic tube alignment system of claim 11, wherein said tube wall has a non-cylindrical shape.

15. An elastic tube alignment system for aligning components to each other, comprising:
a first component;
a second component;
a plurality of upstanding elastic tubes connected to at least one of said first and second components, each elastic tube of the plurality of upstanding elastic tubes having a tube wall;
a plurality of apertures formed in at least one of said first and second components, each aperture of the plurality of apertures having an aperture wall;
wherein said plurality of apertures are geometrically distributed in coordinated relationship to a geometrical distribution of said plurality of elastic tubes such that each elastic tube of the plurality of upstanding elastic tubes is receivable into a respective aperture of the plurality of apertures;
wherein when each said elastic tube of the plurality of elastic tubes is received into its respective aperture of the plurality of apertures, an elastic deformation occurs at an interface between the tube wall and the aperture wall, wherein said elastic deformation is caused to each said tube wall having a diameter larger than at least a portion of its respective aperture;
wherein said elastic deformation is averaged over the total of said elastically deformed tubes such that the first component is precisely located relative to the second component, said elastic deformation comprising resiliently reversible elastic deformation of each said tube wall; and
wherein a predetermined number of elastic tubes of said plurality of elastic tubes is heat staked after said first component has been mated to said second component.

* * * * *